(12) United States Patent
Seidl et al.

(10) Patent No.: US 9,409,723 B2
(45) Date of Patent: Aug. 9, 2016

(54) ROLLER-TYPE CONVEYOR FOR PLASTICS MATERIAL PRE-FORMS

(71) Applicant: KRONES AG, Neutraubling (DE)

(72) Inventors: Andreas Seidl, Donaustauf (DE); Martin Seger, Neumarkt i. d. Oberpfalz (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 13/860,087

(22) Filed: Apr. 10, 2013

(65) Prior Publication Data

US 2013/0264174 A1  Oct. 10, 2013

(30) Foreign Application Priority Data

Apr. 10, 2012 (DE) .......................... 10 2012 103 079

(51) Int. Cl.
*B65G 47/24* (2006.01)
*B65G 39/07* (2006.01)
*B65G 39/02* (2006.01)
(Continued)

(52) U.S. Cl.
CPC ............ *B65G 47/24* (2013.01); *B29C 49/4205* (2013.01); *B65G 37/00* (2013.01); *B65G 39/02* (2013.01); *B65G 39/07* (2013.01); *B65G 47/256* (2013.01); *B29C 49/06* (2013.01)

(58) Field of Classification Search
CPC ........ B65G 39/02; B65G 39/07; B65G 39/18; B65G 37/00; B65G 47/24; B65G 47/256; B29C 49/4205; B29C 49/06
USPC .............................. 198/389, 608, 624; 492/28
See application file for complete search history.

(56) References Cited

U.S. PATENT DOCUMENTS 3,196,701 A * 7/1965 Morrow ............... B65G 39/071
                                                    198/785
3,988,976 A * 11/1976 Slezak ................... A23N 12/08
                                                    193/2 B
(Continued)

FOREIGN PATENT DOCUMENTS

DE         29912271     11/1999    ............. B65G 39/07
DE         29920618      3/2000    ............. B65G 39/07
(Continued)

OTHER PUBLICATIONS

German Search Report issued in corresponding application No. 10 2012 103 079.0, dated Oct. 11, 2012 (5 pgs).
(Continued)

*Primary Examiner* — Leslie A Nicholson, III
*Assistant Examiner* — Keith R Campbell
(74) *Attorney, Agent, or Firm* — Hayes Soloway P.C.

(57) ABSTRACT

An apparatus for the conveying of plastics material containers and, in particular, plastics material pre-forms with a first roller arranged so as to be rotatable about its longitudinal axis, with a second roller arranged so as to be rotatable about its longitudinal axis, wherein the first roller and the second roller are arranged with respect to each other such that the plastics material containers can be conveyed between these rollers, wherein the plastics material container is supported by the two rollers during conveying. At least one roller has a main body produced from a first material and a layer which surrounds this main body in its peripheral direction and which is produced from a plastics material differing from the first material, wherein this layer acts as a contact layer for contacting the plastics material containers.

26 Claims, 3 Drawing Sheets

(51) Int. Cl.
*B65G 47/256* (2006.01)
*B65G 37/00* (2006.01)
*B29C 49/42* (2006.01)
*B29C 49/06* (2006.01)

(56) References Cited

U.S. PATENT DOCUMENTS

| | | | | |
|---|---|---|---|---|
| 4,223,778 | A * | 9/1980 | Kontz | B65G 47/1471 |
| | | | | 198/389 |
| 5,044,061 | A | 9/1991 | Kramer | 29/447 |
| 5,320,042 | A * | 6/1994 | Schwopfinger | B41F 22/00 |
| | | | | 101/416.1 |
| 6,059,095 | A | 5/2000 | Tsuji | 198/780 |
| 6,202,557 | B1 * | 3/2001 | Kustermann | B05C 1/0808 |
| | | | | 101/376 |
| 6,428,455 | B1 | 8/2002 | Sohl | 492/50 |
| 6,716,148 | B1 * | 4/2004 | Fortin | B41F 31/26 |
| | | | | 29/895.22 |
| 6,849,224 | B2 * | 2/2005 | Wang | A61F 2/30 |
| | | | | 264/478 |
| 6,896,647 | B1 | 5/2005 | Karger et al. | 492/50 |
| 6,918,865 | B2 * | 7/2005 | Vergara | D21G 1/0233 |
| | | | | 29/895.3 |
| 6,968,936 | B2 * | 11/2005 | Charpentier | B65G 47/1428 |
| | | | | 198/389 |
| 7,147,596 | B2 * | 12/2006 | Reynolds | B65G 39/02 |
| | | | | 492/39 |
| 7,556,137 | B2 * | 7/2009 | Charpentier | B07C 5/02 |
| | | | | 198/369.7 |
| 7,897,232 | B2 | 3/2011 | Gerbing et al. | 428/66.2 |
| 8,337,193 | B2 * | 12/2012 | Brown | B29C 49/4205 |
| | | | | 198/389 |
| 8,490,797 | B2 * | 7/2013 | Tanner | B29C 49/4205 |
| | | | | 198/389 |
| 2001/0051567 | A1 * | 12/2001 | Schaschke | B41N 7/00 |
| | | | | 492/56 |
| 2003/0162641 | A1 | 8/2003 | Reynolds | 492/54 |
| 2004/0087423 | A1 | 5/2004 | Vergara | 492/48 |
| 2004/0109747 | A1 | 6/2004 | Charpentier | 414/403 |
| 2009/0155036 | A1 | 6/2009 | Deyerl | 414/539 |
| 2011/0058760 | A1 | 3/2011 | Magnus | 384/280 |
| 2011/0120833 | A1 | 5/2011 | Tanner | 198/444 |
| 2011/0198270 | A1 | 8/2011 | Beutl et al. | 209/552 |

FOREIGN PATENT DOCUMENTS

| | | | |
|---|---|---|---|
| DE | 19919569 | 11/2000 | D21G 1/02 |
| DE | 10213379 | 10/2003 | B29C 59/04 |
| DE | 69827983 | 11/2005 | B32B 1/08 |
| DE | 60118772 | 5/2007 | B65G 47/14 |
| DE | 102006021035 | 11/2007 | B65G 39/16 |
| DE | 102007046156 | 4/2009 | F16D 69/02 |
| DE | 102008042684 | 4/2010 | D21F 3/08 |
| DE | 102010005475 | 7/2011 | B65G 39/07 |
| DE | 102010008367 | 8/2011 | B65G 47/22 |
| EP | 1057931 | 12/2000 | D21G 1/02 |
| EP | 2072427 | 6/2009 | B65G 47/14 |
| EP | 2303733 | 4/2011 | B65G 47/14 |
| EP | 2357146 | 8/2011 | B29C 49/42 |
| WO | WO0236466 | 5/2002 | B65G 47/14 |

OTHER PUBLICATIONS

Extended European Search Report issued in corresponding application No. 13163121.0-1707, dated Oct. 9, 2013 (4 pgs).

English translation of First Chinese Office Action issued in corresponding Chinese Patent Appln. No. 20310123451.X dated Jan. 27, 2015 (2 pgs).

* cited by examiner

Prior Art

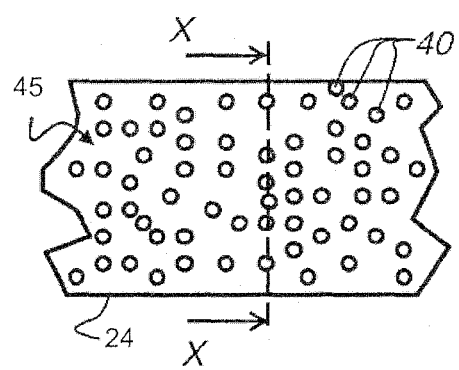
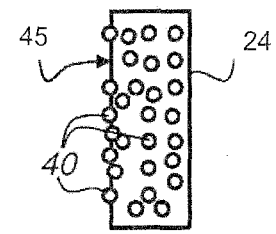
Fig. 6a　　　　　　　　Fig. 6b
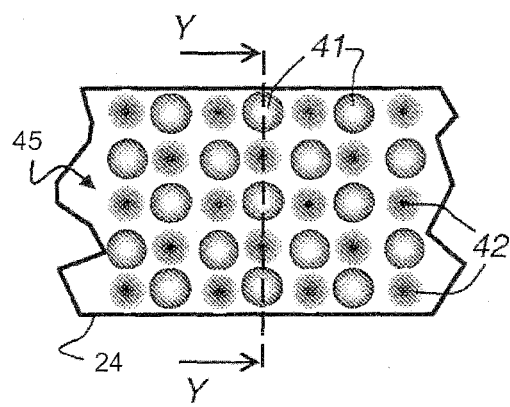
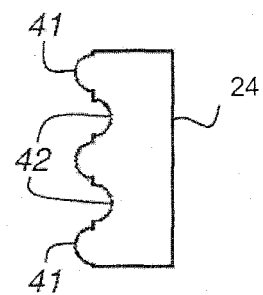
Fig. 7a　　　　　　　　Fig. 7b

ROLLER-TYPE CONVEYOR FOR PLASTICS MATERIAL PRE-FORMS

BACKGROUND OF THE INVENTION

The present invention relates to an apparatus for the conveying of plastics material containers, in particular of plastics material pre-forms. A plurality of conveying apparatus for the conveying of plastics material containers is known from the prior art. In particular, conveying devices for the conveying of plastics material pre-forms are also known. Plastics material pre-forms of this type are usually first heated in the production process and after that are shaped into plastics material containers in a blow moulding machine such as for example a stretch blow moulding machine. For this purpose it is necessary for these plastics material pre-forms to be conveyed already sorted, for example to a single-stroke wheel. So-called roller-type sorting means, which have two rotating rollers which are arranged parallel to each other and between which the plastics material pre-forms are conveyed, are known from the prior art for this purpose.

An apparatus of this type is described for example in DE 601 18 772 T2. In this case an ejection apparatus is also provided, which permits an ejection of incorrectly orientated pre-forms from the conveying system.

U.S. Pat. No. 4,223,778 describes a further "pre-form" conveyor of the type described above. Here too in this case the rollers are also arranged at a distance from each other such that only the end portions of the pre-forms can fall into the gap formed by the rollers, but the carrier rings are held. As a result of a suitable inclination of these two rollers the plastics material pre-forms can be conveyed under the action of gravity.

The aforesaid rollers of roller-type sorting means of this type are usually metallic rollers which have to be balanced very precisely.

In recent years plastics material pre-forms with very small carrier rings have been processed to an increasing degree. This results to an increasing degree, however, in problems with the roller geometry in the roller-type sorting means. In this case the plastics material pre-forms slip increasingly deeply into the interspace formed between the two rollers and can no longer be correctly conveyed in part. In addition, jamming occurs increasingly frequently and the sliding behaviour also decreases.

The object of the present invention is therefore to improve roller-type sorting means in particular also for problematic plastics material pre-forms such as plastics material pre-forms with comparatively small carrier ring diameters.

SUMMARY OF THE INVENTION

An apparatus according to the invention for the conveying of plastics material containers and, in particular, plastics material pre-forms has a first roller arranged so as to be rotatable about its longitudinal axis as well as a second roller arranged so as to be rotatable about its longitudinal axis. In this case the first and the second roller are arranged with respect to each other in such a way that the plastics material containers can be conveyed between these rollers, the respective plastics material container being supported by the two rollers during the conveying.

According to the invention at least one roller has a main body produced from a first material and a layer which surrounds this main body in its peripheral direction and which is produced from a further material differing from the first material (or more generally a further body surrounding the main body over its entire periphery), this layer acting as a contact layer for contacting the plastics material containers (during the conveying thereof).

It is advantageous for the further material to be a plastics material, but it would also be possible to use a metal, as explained below.

It is advantageous for the two rollers to be designed in the manner described, i.e. to have the main body produced from the first material and with the aforesaid plastics material layer surrounding this main body. In this way, it is advantageous for the layer to have an annular cross-section. In addition, the main body preferably has a substantially annular cross-section.

It is advantageous for the first material to be a plastics material. It would also be possible, however, for other materials such as for example aluminium to be used. The expression "different plastics materials" is to be understood as meaning that the material of the plastics material of the main body differs in at least one physical property from the plastics material of the layer.

It is advantageous for the containers to be conveyed in the longitudinal direction of the rollers and, in particular, the containers are conveyed under the action of gravity. In this case it is advantageous for the containers or plastics material pre-forms to slide at least for a time along the rollers in the longitudinal direction of the rollers.

It is advantageous for the rollers to be arranged at a distance from each other in such a way that a base body of the plastics material pre-forms can pass between the rollers and that, in this way, a sorting procedure takes place during the conveying.

As a result of using a plastics material for the main body, the roller can be made relatively light as a whole and, nevertheless, stable. In this way, a balancing of the rollers is no longer so critical as in the prior art. It is also possible for the rotational speed of the rollers also to be increased in this way. In addition, the design according to the invention allows a very precise production of the rollers, since any imbalance of the high rotational speeds of the rollers can also lead to breakdowns. In this way, the weight of the roller is reduced on the one hand and at the same time the dimensional stability is ensured on the other hand.

In the case of an advantageous embodiment a thickness of the layer applied to or arranged on the main body is between 0.1 mm and 10 mm, preferably between 0.1 mm and 3 mm, and in a particularly preferred manner between 0.1 mm and 1 mm.

On account of the provision of a two-component material, i.e. of the main body on the one hand and of the layer on the other hand, a special layer material can be selected which has for example a high degree of stability and at the same time a low degree of friction. The main body can consist, however, of a comparatively inexpensive material. It is advantageous for the two rollers to have an inclination with respect to a horizontal which is between 5 degrees and 20 degrees, preferably between 6 degrees and 18 degrees, and in a particularly preferred manner between 7 degrees and 15 degrees.

In the case of a further advantageous embodiment, in working operation the rollers have a rotational speed which is greater than 300 r.p.m., preferably greater than 350 r.p.m., preferably greater than 400 r.p.m., and in a particularly preferred manner greater than 450 r.p.m.

In addition, it is preferable for a ratio between the length of the roller and a diameter of the roller to be greater than 35, preferably greater than 45, preferably greater than 50, and preferably greater than 60.

In the case of a further advantageous embodiment the rollers are formed substantially parallel to each other. It is particularly preferred in this case for a radial thickness of the layer to be made less than a radial thickness of the main body. The radial thickness of the main body is advantageously between 1 mm and 5 mm.

In the case of a further advantageous embodiment at least one drive device is provided for driving the rollers. It is preferable for two drive devices to be provided for driving the rollers. It is advantageous for at least one of these driving devices to have an electric motor. It is advantageous in this case for the two rollers to be driven in opposite directions, preferably in such a way that the plastics material pre-form is raised against the force of its gravity by the rotation of the rollers.

A lacquer, which has reduced friction and is wear resistant and which, in addition, can be further hardened by means of radiation, can also advantageously be applied as the layer.

It is particularly advantageous for the layer to have additional conductive properties so that no static charging takes place.

In the case of an advantageous embodiment the layer has a plastics material treated by means of radiation and/or a plastics material mixed with a plurality of bodies and in particular a plurality of sphere-like bodies.

In the case of both the steps a special stability and a low degree of wear of the respective roller can be achieved.

In the case of a further advantageous embodiment the layer is produced from a material which is chosen from a group of materials which contains polyamide (PA), polyether ketone (PEEK), polyoxymethylene (POM), ultra-high-molecular-weight polyethylene (UHMW PE/PE UHMW) and the like. These materials are suitable in particular for the layer, particularly if they have been mixed with the sphere-like bodies or have been treated by means of radiation, in particular in order to make available a layer with very low friction. It is preferable for the plastics material to be treated by means of radiation and, in addition, to have a plurality of the bodies, in particular sphere-like bodies, specified above.

In this way it is possible for the surface structure of the material to be formed by a plurality of spherical elements or to have such a plurality of elements, which are embedded in a base material and/or carrier material of the guide device or a guide insert. It is advantageous in this case for these elements, in particular spherical elements, to be produced from a material which is chosen from a group of materials which contains glass or ceramic spheres and the like, preferably unipolar fillers.

It is advantageous in this case for these additional bodies, for example spherical bodies, to have in each case cross-sections or volumes which have a diameter of less than 1 mm, preferably less than 0.1 mm, and in a particularly preferred manner less than 0.01 mm.

It is advantageous for a weight ratio of these spherical bodies with respect to the total material to amount to more than 5%, preferably to more than 10%, and in a particularly preferred manner to more than 20%.

The Applicants have further ascertained that plastics materials treated by means of radiation (as specified above), in particular plastics materials cross-linked by means of radiation, have a considerably improved property, in particular with respect to the frictional properties. An irradiation of plastics materials in this way has already been known for a relatively long time. Originally, an attempt was made to search for a suitable insulation material for cables. It was found in this case that the irradiation of specified plastics materials by radiation induces a cross-linking of the plastics material and, in addition, also a degradation of polymers. The cross-linking was originally understood as being a reaction in which a plurality of individual macromolecules are linked to form a three-dimensional network. In this case the properties of the material change. The aim is to impart a greater degree of hardness or even temperature resistance to polymer materials for example in this case.

It is advantageous for a precisely determined amount of energy to be introduced into the plastics material during the radiation treatment, in which case for example electron accelerators of different capacity (for beta rays) or even a cobalt-60 source (for gamma rays) can be used.

The Applicants have established that this action of ionizing radiation is also harmless for the treatment with foodstuffs, since no radioactivity is produced by ionizing radiation in plastics materials themselves.

In the case of a further advantageous embodiment the layer is produced from a material which contains fluoropolymers. Materials of this type such as for example PTFE (polytetrafluoroethylene), PFA (perfluoroalkoxy) or FEP (fluorinated ethylene propylene) have a relatively low tendency to adhesion or a high anti-adhesion effect. PFA and FEP are copolymers of PTFA. In this case it is possible to use the aforesaid materials in a pure form for coating purposes, but it is preferable for a so-called primer layer to be applied in order to improve the adhesion. In addition, it would also be possible to use a primer system which can also have a plurality of layers.

In this way it would be possible to use adhesion agent additives, such as for example pigments, heat stabilizers and/or bonding resins, in the coating systems. In addition, further components can also be incorporated in the coating, such as for example hard, abrasion-resistant components. In this case the thickness of the layer can also be increased.

In the case of a further advantageous embodiment the layer contains a metal or is a metallic layer. In particular, this is a layer applied by means of a (metallic) flame spraying. The flame spraying belongs to the thermal coating process. Materials in the form of powder, wire, string or rods can be treated with this process and can be sprayed onto surfaces of components. In addition, however, it would also be possible for ceramics or plastics materials to be sprayed on with this method.

The plastics material containers are, in particular, PET containers. It is preferable for the radiation treatment of the plastics materials to be, in particular, an irradiation or cross-linking of these plastics materials by gamma and/or beta rays. It is therefore advantageous for at least the guide faces towards the containers to have a plastics material treated by means of radiation. In the case of a further advantageous embodiment the guide device is formed from at least two components.

An essential difference between these two types of radiation lies in the penetration capacity and the dose rate.

In plants with electron accelerators, the operation is carried out with high dose rates, but with a limited depth of penetration dependent upon the energy. Even relatively large components can have electrons radiated through them by the accelerator plants with high electron energy which in the meantime have become available.

Gamma rays on the other hand have a high penetration capacity with a relatively low dose rate. In terms of the application this means that in the electron accelerators the dose is applied within a period of seconds to the material to be radiated, whereas several hours are required for this in a gamma plant.

In particular, in the case of moulded parts of compact design, gamma rays can in turn have a major advantage. It is advantageous for electron beams to be used in the irradiation of the material.

In the case of a further advantageous embodiment the main body has a material containing carbon fibres and, in a particularly preferred manner, consists of a material containing carbon fibres, in particular a carbon fibre material. Such a material containing carbon fibres is particularly light in weight as well as dimensionally stable and is therefore well suited as a starting material for the roller. In particular, carbon is therefore chosen as the roller core. Carbon has the drawback, however, that the coefficients of friction thereof are relatively high and in this case do not permit sliding of the plastics material pre-forms in the case of a gradient of 9 degrees for example. The aforesaid carbon core or main body is therefore coated with a plastics material which reduces the coefficients of friction in a purposeful manner. The layers specified above are suitable for this in a special manner.

In the case of a further advantageous embodiment the main body has a glass-fibre-reinforced plastics material (GFP). A GFP material of this type is particularly light in weight and dimensionally stable and is thus likewise well suited as a starting material for the roller. In particular, therefore, GFP is also chosen as the roller core, but it likewise has the drawback that the coefficients of friction thereof are relatively high and in this case [do] not permit sliding of the plastics material pre-forms in the case of a gradient of 9 degrees for example.

In this way, the roller diameter can be reduced as a whole and at the same time the surface thereof can also be optimized in terms of friction.

In the case of a further advantageous embodiment the main body is designed in the form of a hollow body. In this way, the mass of the roller as a whole can also be reduced.

It is particularly advantageous for at least one roller, and preferably both the rollers, to have a diameter which is between 30 mm and 90 mm, preferably between 35 mm and 60 mm, and in a particularly preferred manner between 35 mm and 50 mm.

In the case of a further advantageous embodiment the apparatus has an ejection device for ejecting or separating out plastics material pre-forms and, in particular for ejecting or separating out incorrectly orientated plastics material pre-forms. In this case for example a kicker wheel can be provided which is arranged above the conveying path of the plastics material pre-forms and which ejects incorrectly orientated plastics material pre-forms or also plastics material pre-forms sticking in one another.

In addition, a holding-down element can also be provided which orientates the plastics material pre-forms more precisely with respect to the two rollers.

The present invention further relates to a conveying roller for an apparatus of the type described above. In this case this roller has a main body produced from a first material, and in particular from a main body produced from a plastics material, and a layer surrounding this main body in the peripheral direction thereof and produced from a further plastics material different from the first plastics material. This layer is used in this case as a contact layer for contacting the plastics material containers. In this way, it is also proposed with respect to the conveying roller that it consists of a specified material for a main body and a layer arranged around this main body. It is advantageous for this layer to surround the main body in the peripheral direction and, in a particularly preferred manner, also to cover it completely in the longitudinal direction thereof.

In an advantageous embodiment the main body has a plastics material containing carbon fibres and/or the layer has a plastics material treated by means of radiation and/or a plastics material mixed with a plurality of sphere-like bodies.

The present invention further relates to a method of conveying plastics material containers, and in particular plastics material pre-forms. In this case the plastics material pre-forms are conveyed between a first roller rotating at least for a time about its longitudinal axis and a second carrier body, in which case the plastics material pre-forms are supported during the conveying thereof both by the first roller and by the second carrier body.

According to the invention at least the first roller and/or the second carrier body has or have a main body produced from a first material, and a layer surrounding this main body in the peripheral direction thereof (at least in part in the case of the carrier body) and produced from a further material different from the first material, this layer contacting the plastics material pre-forms at least for a time during the conveying thereof.

It is therefore also proposed in terms of the method that the plastics material containers, and in particular the plastics material pre-forms, are moved with respect to a coating of the type described above. In this case the plastics material pre-forms are preferably supported below the carrier rings by the roller and the carrier body.

In the case of a further advantageous method the second carrier body is likewise a roller which rotates about the longitudinal axis thereof at least for a time. It would also be possible, however, for the second carrier body to be a rail, and in particular a rail extending in a straight line.

It is advantageous for the plastics material pre-forms also to be conveyed under the action of gravity or at least in part along a descending conveying path.

BRIEF DESCRIPTION OF THE DRAWINGS

Further advantages and embodiments are evident from the accompanying drawings. In the drawings

FIGS. 6a, b shows an advantageous arrangement of a material for the layer, and

FIGS. 7a, b show a further advantageous arrangement of a material for the layer.

DETAILED DESCRIPTION OF THE INVENTION

Figure 1:
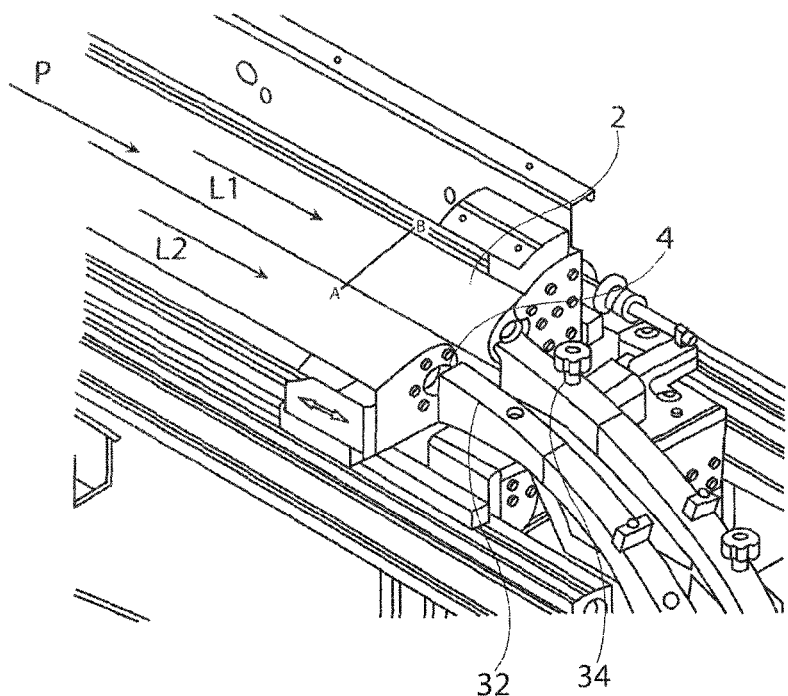
FIG. 1 is a part illustration of a roller-type sorting means according to the prior art.

FIG. 1 is a diagrammatic view of an apparatus according to the invention or a roller-type sorting means 1 according to the prior art. In this case two rollers 2 and 4 are provided (the roller 4 is visible only to a small degree since it is otherwise covered) which are arranged parallel to each other. The plastics material pre-forms can be conveyed along a pre-set conveying path P between these two rollers 2 and 4. It is advantageous for the plastics material pre-forms to be conveyed in a straight line through the roller-type sorting means. The references L1 and L2 refer to the longitudinal directions of the rollers 2, 4.

In this case the plastics material pre-forms can pass for example from a chute (not shown) to the aforesaid two rollers 2, 4 and they are orientated in the course of the conveying in such a way that the carrier rings thereof are supported by the two rollers 2, 4 and the main bodies of the plastics material pre-forms move between the rollers. The two rollers 2, 4 are adjoined by removal rails 32, 34 between which the plastics material pre-forms can be further conveyed (again preferably under the action of gravity).

Figure 2:
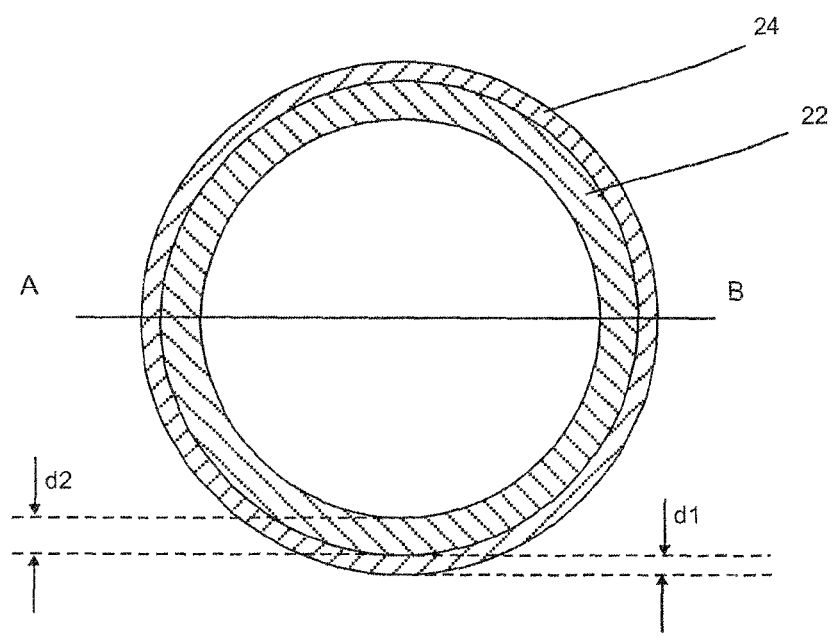
FIG. 2 is a diagrammatic illustration of a roller according to the invention.

FIG. 2 is a diagrammatic illustration of a roller according to the invention. This roller has in this case a main body 22 which, in particular, is produced from carbon fibres. This main body 22 is enclosed by a layer 24 which surrounds it completely. A radial thickness d1 of this layer 24 is smaller in this case than a radial thickness d2 of the main body 22. In addition, webs (not shown) can also be provided which project radially inwards so that the roller can be driven so as to rotate about the longitudinal direction L1 thereof (which in this case extends at a right angle to the plane of the figure). The reference letters A and B designate the diameter of the roller 2. The roller 4 is preferably designed in a corresponding manner.

Figure 3:
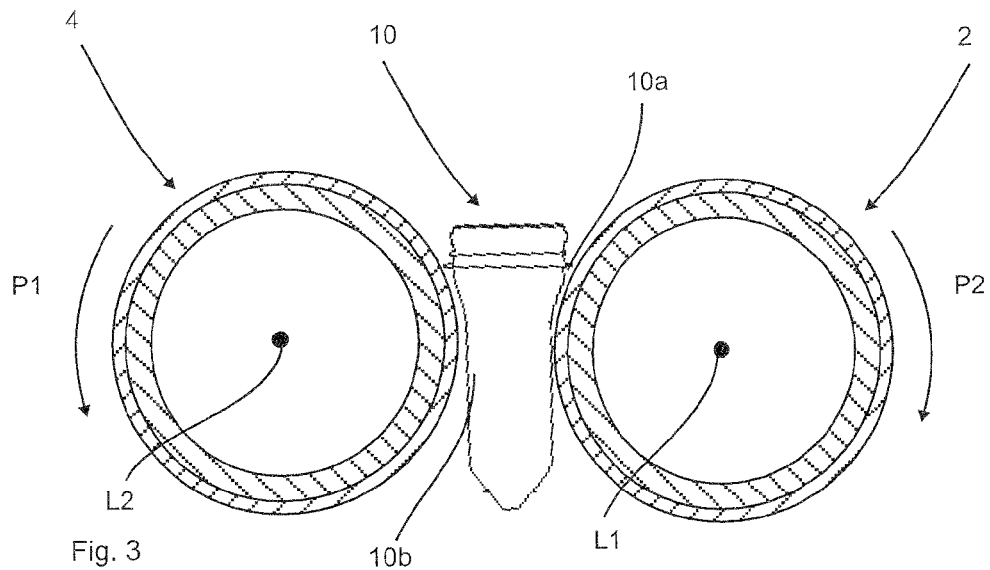
FIG. 3 is a diagrammatic illustration of the conveying of a plastics material pre-form between two rollers.

FIG. 3 shows the conveying of the plastics material pre-forms 10 through the two rollers 2 and 4. In this case the plastics material pre-form 10 is guided between the two rollers and only the carrier ring 10a of the preform is supported on the two rollers 2, 4. Ideally the main body 10b of the plastics material pre-forms 10 does not touch the two rollers or touches them only occasionally. It is nevertheless advantageous, however, for the layer 24 to be designed in such a way that a frictional resistance with the plastics material pre-forms is as low as possible. The references P1 and P2 indicate the directions of rotation of the two rollers 2, 4. As a result of this opposite rotation the plastics material pre-forms are better orientated, as known per se from the prior art. The references L1 and L2 refer to the longitudinal directions of the plastics material pre-forms 10 which are at a right angle in this case to the plane of the figure. In addition, the conveying path of the plastics material pre-forms 10 extends in this case at a right angle to the plane of the figure.

Figure 4:
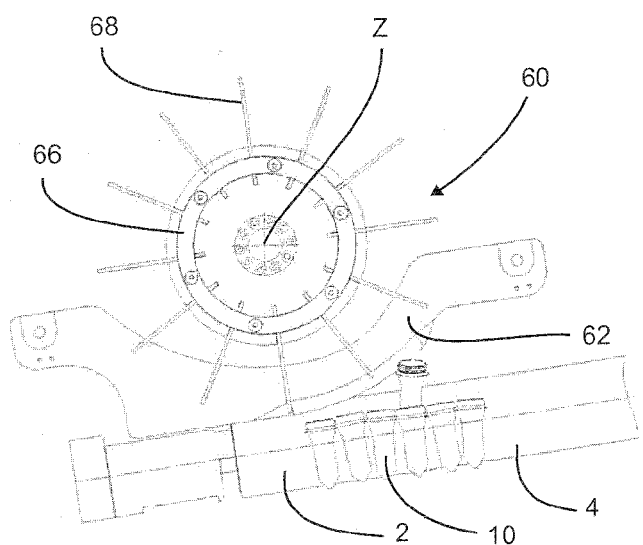
FIG. 4 is a diagrammatic side view of a roller-type sorting means according to the invention.

FIG. 4 is a further diagrammatic illustration of an apparatus 1 according to the invention. It is evident that an ejection or separating-out device designated 60 as a whole is provided in this case above the two rollers 2, 4 and thus also above the conveying path of the plastics material pre-forms 10. This ejection device has a wheel 66 which is rotatable with respect to an axis Z and on which are arranged a plurality of ejection elements 68 which project (radially) outwards and which thus likewise rotate about the axis Z. If a plastics material pre-form is badly orientated, for example inserted into another plastics material pre-form 10 as shown in the figure, it can be grasped and ejected by an ejection element 68. Other types of ejection mechanisms, however, would also be possible. In this way, it would be possible for one of the rollers 2, 4 or a segment of a roller 2, 4 to be displaced at a right angle to the conveying path of the plastics material pre-forms, so that the corresponding plastics material pre-form can fall downwards out of the sorting means.

The reference number 62 refers to a holding-down element which can likewise be used for ejecting badly orientated plastics material pre-forms.

Figure 5:
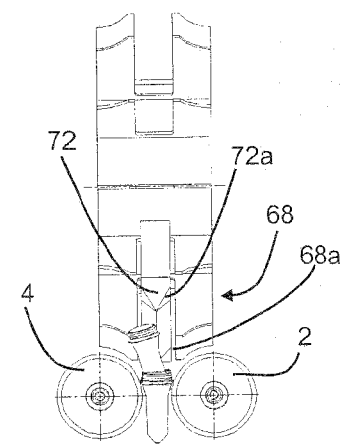
FIG. 5 is a view of the apparatus shown in FIG. 4 along the longitudinal direction of the rollers.

FIG. 5 is a corresponding further view of the apparatus shown in FIG. 4. Here the ejection element 68 is again evident, which has a recess 68a directly above the conveying path of the plastics material pre-forms, so that correctly conveyed plastics material pre-forms cannot be grasped by this ejection element. The reference number 72 designates a guide rail with oblique faces 72a. If a plastics material pre-form with an incorrect orientation is conveyed, it is pushed to the side by this guide rail and it can then be ejected by the ejection element 68.

FIGS. 6a, 6b show a further arrangement of a material according to the invention which can be used, in particular, for the layer 24. Here a plurality of bodies 40 which are substantially spherical here are embedded in the main body 45 of the material of the layer 24. FIG. 6b is a view of the body shown in FIG. 6a along the arrows X-X in FIG. 6. It is evident that in this case a contact face is formed by these individual spherical bodies 40. The raised portions which are produced by the spherical bodies 40 are shown hemispherical here, but the invention is not limited to this. In this way, an undulating guide face is formed as a whole, however, and it has been possible to show that this undulating guide face reduces the coefficient of friction of the surface of the roller 2, 4 or the layer respectively.

In general, it is preferable for this embedding of the spherical bodies also to be combined with a cross-linking of the plastics material by means of radiation. As well as this, additional reinforcement elements can also be provided which reinforce the material of the plastics material as a whole.

FIGS. 7a, 7b show a further embodiment in which raised portions 41 and/or depressions 42 are provided in the material. In this case these raised portions and depressions can also be provided in the form of uniform furrows or grooves or with a different profiling. As a result it is made possible as a whole for the resulting surface of the roller 2, 4 or the layer respectively, which can be in contact with the plastics material pre-forms, to have a smaller support face as a whole in the contact area with the plastics material containers.

The Applicants reserve the right to claim all the features disclosed in the application documents as being essential to the invention, insofar as they are novel either individually or in combination as compared with the prior art.

LIST OF REFERENCES 2, 4 rollers
10 plastics material pre-form
10a carrier ring of the plastics material pre-form
10b main body of the plastics material pre-form
22 main body of the roller
24 layer
32, 34 removal rails
40 spherical body
41 raised portions
42 depressions
45 main body of the material of the layer
60 ejection device
66 rotatable wheel
68 ejection elements
68a recess
72 guide rail
72a oblique faces of the guide rail
d1, d2 thicknesses
P conveying path
P1, P2 directions of rotation of the rollers
Z axis
L1, L2 longitudinal directions of the rollers

The invention claimed is:

1. A method of conveying plastics material pre-forms having carrier rings, comprising conveying the plastics material pre-forms between a first roller rotating at least for a time about its longitudinal axis (L1) and a second carrier body, supporting the plastics material pre-forms during the conveying thereof both by the first roller and by the second carrier body, wherein at least the first roller or the second carrier body has a length-to-diameter ratio of greater than 35, wherein the first roller is driven at an operational rotational speed of greater than 400 r.p.m., and has a main body produced from a first light-weight, dimensionally stable material, and a layer surrounding the main body in the peripheral direction thereof and produced from a second material different from the first material, wherein the layer is formed of a reduced friction material as compared to the material forming the main body, and contacts the plastics material pre-forms at least for a time during the conveying thereof, passing the plastics material pre-forms from a chute to the first roller and the second carrier body, while supporting the main bodies of the plastics material pre-forms on their carrier rings as they are moved between the first roller and the second carrier body, and wherein the first roller and the second carrier body are adjoined by removal rails between which the plastics material pre-forms are further conveyed under action of gravity.

2. The method according to claim 1, wherein the second carrier body is a roller which rotates about the longitudinal axis (L2) thereof at least for a time.

3. The method according to claim 1, wherein at least one roller has a diameter which is between 35 mm and 60 mm.

4. The method according to claim 1, wherein at least one roller has a diameter which is between 35 mm and 50 mm.

5. The method according to claim 1, wherein the layer has a plurality of substantially spherical bodies embedded therein.

6. The method according to claim 1, wherein the spherical bodies extend in part from the layer, forming a contact space.

7. The method according to claim 1, wherein the spherical bodies extend in part from the layer, forming spherically-raised portions, whereby to reduce a coefficient of friction of the layer.

8. The method according to claim 1, wherein the spherical bodies are combined with a cross-linking of the plastics material by radiation.

9. The method according to claim 1, wherein a surface of the layer includes raised portions and pressed portions.

10. The method of claim 9, wherein the raised portions and the pressed portions are in the form of uniform furrows or grooves.

11. The method according to claim 9, wherein the raised portions and the pressed portions have a non-uniform profile.

12. The method according to claim 1, further comprising a kicker wheel arranged above conveying path of the plastics material pre-forms for ejecting incorrectly orientated plastics material pre-forms or plastics material pre-forms sticking in one another.

13. The method according to claim 1, wherein the main body is in the form of a hollow body.

14. The method according to claim 1, wherein the first light-weight, dimensionally stable material comprises a material containing carbon fibers.

15. An apparatus for the conveying of plastics material pre-forms, comprising a first roller arranged so as to be rotatable about its longitudinal axis (L1), and a second roller arranged so as to be rotatable about its longitudinal axis (L2), wherein the first roller and the second roller are arranged with respect to each other in such a way that the plastics material pre-forms can be conveyed between the two rollers, wherein the plastics material pre-forms are supported by the two rollers during the conveying, wherein at least one roller has a length-to-diameter ration of greater than 35, a drive for driving said at least one roller at an operational rotational speed of greater than 400 r.p.m., and a main body produced from a first light-weight, dimensionally stable material and a layer which surrounds the main body in its peripheral direction and which is produced from a second material differing from the first material, wherein the layer has a plastics material treated using radiation and/or a plastics material mixed with a plurality of sphere-like bodies, wherein the layer is formed of a reduced friction material as compared to the first material, and acts as a contact layer for contacting the plastics material pre-forms and removal rails adjoining the first roller and the second roller between which the plastics material pre-forms are further conveyed under action of gravity.

16. The apparatus according to claim 15, wherein the layer has a plastics material treated using radiation and/or a plastics material mixed with a plurality of sphere-like bodies.

17. The apparatus according to claim 15, wherein the layer is produced from a material which is selected from a group of materials which contains PA, PEEK, POM and UHMW PE.

18. The apparatus according to claim 15, wherein the layer is produced from a material which contains fluoropolymers.

19. The apparatus according to claim 15, wherein the layer contains a metal or is a metallic layer.

20. The apparatus according to claim 15, wherein the main body has a glass-fiber-reinforced plastics material (GFP).

21. The apparatus according to claim 15, wherein the apparatus has an ejection device for ejecting the plastics material pre-forms.

22. A conveying roller according to claim 15, wherein the layer has a plastics material treated using radiation and/or a plastics material mixed with a plurality of sphere-like bodies.

23. The apparatus according to claim 15, further comprising a kicker wheel arranged above a conveying path of the plastics material pre-forms for ejecting incorrectly orientated plastics material pre-forms or plastics material pre-forms sticking in one another.

24. An apparatus for the conveying of plastics material pre-forms having carrier rings, said apparatus comprising, a first roller arranged so as to be rotatable about its longitudinal axis (L1), a second roller arranged so as to be rotatable about its longitudinal axis (L2), wherein the first roller and the second roller are arranged with respect to each other in such a way that the plastics material pre-forms can be conveyed between these rollers, wherein the plastics material pre-forms are supported by the two rollers during the conveying, wherein at least one roller has a diameter which is between 35 and 60 mm, a length-to-diameter ratio of greater than 45, and a drive for driving said at least one roller at an operational rotational speed of greater than 400 r.p.m., wherein at least one roller has a main body produced from a first light-weight, dimensionally stable material and a layer which surrounds the main body in its peripheral direction and which is produced from a second material differing from the first material, wherein the layer is formed of a reduced friction material as compared to the first material, and acts as a contact layer for contacting the plastics material pre-forms, a chute adjacent the first and second rollers, wherein main bodies of the plastics material pre-forms move between the first and second rollers supported on the carrier rings, and removal rails adjoining the first and second rollers between which the plastics material pre-forms are further conveyed under action of gravity.

25. The apparatus according to claim 24, wherein the main body is in the form of a hollow body.

26. The apparatus according to claim 24, wherein the first light-weight, dimensionally stable material comprises a material containing carbon fibers.

* * * * *